June 26, 1962 HANS-JOACHIM HENKEL ETAL 3,041,508

TUNNEL DIODE AND METHOD OF ITS MANUFACTURE

Filed Nov. 30, 1960

United States Patent Office 3,041,508

Patented June 26, 1962

3,041,508
TUNNEL DIODE AND METHOD OF ITS MANUFACTURE

Hans-Joachim Henkel and Rolf Gremmelmaier, Erlangen, Germany, assignors to Siemens-Schuckertwerke Aktiengesellschaft, Berlin-Siemensstadt, Germany, a corporation of Germany Filed Nov. 30, 1960, Ser. No. 72,617
Claims priority, application Germany Dec. 7, 1959
13 Claims. (Cl. 317—234)

Our invention relates to electronic semiconductor diodes utilizing the so-called tunnel effect, and to methods of making such tunnel diodes.

According to a publication in Physical Review, volume 109 (1958), page 603, L. Esaki discovered that very narrow germanium p-n junctions exhibiting a range of negative resistance in the forward direction. If the n-region and the p-region are both so highly doped as to be degenerated, and if the change in doping in the junction region is virtually abrupt so that the field strength at that locality attains values of some $10^5$ volt/cm., a small voltage impressed across the two electrodes suffices to drive electrons from the lowermost level of the conduction band in the n-region directly into the uppermost levels of the valence band in the p-region (tunnel effect). At first, this electron current increases with increasing voltage—i.e. with increasing difference of the respective Ferni levels in the p- and n-regions—but then decreases at still higher voltages because the energy interval in which a tunnel effect in the forward direction is possible decreases with increasing voltage. The share of current flow stemming from the tunnel effect approaches zero as soon as the voltage becomes so high that the lower edge of the conduction band in the n-region is higher than the upper edge of the valence band in the p-region. This share of current is superimposed upon the ordinary current flow which increases exponentially with the voltage.

The tunnel diodes, utilizing this effect, constitute a simple electric circuit component for generation of oscillations and for amplification in the high-frequency range. The frequency limit of tunnel diodes is essentially determined by the product RC of the negative resistance R and the capacitance C of the diode. Since C is proportional and R inversely proportional to the area of the p-n junction, the value of RC is independent of the area. Although the capacitance depends upon the width of the p-n junction and hence upon the degree of doping, this dependency is not by far as great as that of the negative resistance R. In first approximation, R is inversely proportional to the probability of an electron penetrating through the "forbidden zone." This probability is the greater, the smaller the apparent mass of the charge carriers in the conduction band and valence band respectively, the smaller the width of the forbidden zone, and the higher the majority carrier concentration in the n-region and p-region respectively. Consequently, a small negative resistance and hence a high frequency limit would have to be expected if one used for the tunnel diode a semiconductor of small apparent mass and small forbidden-zone width, and if the semiconductor is given a highest possible doping in the n-region and p-region. For that reason, the semiconductor materials heretofore disclosed for such diodes namely germanium, indium antimonide (InSb) and gallium antimonide (GaSb) satisfy the just-mentioned conditions.

Recently it has also been proposed to use gallium arsenide (GaAs) as semiconductor material for tunnel diodes. Such diodes have a small negative resistance and hence a very high frequency limit, and they are practically independent of temperature within a wide temperature range, in contrast to the tunnel diodes previously known. These properties cannot be attained to any comparable degree with any other semiconductor composition.

The use of GaAs for tunnel diodes appears to meet the objection that this substance has a very wide forbidden zone, whereas according to the foregoing a narrow forbidden zone is to be aimed at. Also adverse to the use of GaAs is the fact that technological difficulties have been expected in the production of highly doped regions in this material.

However, while the wide forbidden zone of GaAs would be unfavorable with respect to the desired negative resistance, it has been found that this detriment is compensated on the one hand, by the very small effective mass of the charge carriers in GaAs—this mass being smaller than that of the elemental semiconductors suitable—and, on the other hand, by the advantage that the tunnel effect in GaAs is practically in dependent of temperature in a greater range than with the other semiconductors. This is, because if the diode is to reliably operate at relatively high temperatures, the width of the forbidden zone must be great, and this requirement is met by GaAs to a better extent than with the other materials mentioned. Since the tunnel current is superimposed by the ordinary current flow of the p-n junction, and since this ordinary current, according to diode theory, is proportional to exp $$\left(-\frac{\Delta E}{KT}\right)$$

wherein ΔE is the width of the forbidden zone, T the absolute temperature and K a constant, the range of negative resistance in the diode characteristic, under otherwise the same operating conditions, extends toward higher temperatures with an increased width of the forbidden zone.

From these viewpoints therefore, tunnel diodes of GaAs are of outstanding advantage. GaAs has a very great width of the forbidden zone ($\Delta E=1.4\ eV$ at room temperature, 20° C.), and the apparent mass of the conductance electrons is relatively small ($m_3 \approx 0.04\ m_0$).

With GaAs tunnel diodes, however, it is difficult to give the n- and p-regions a sufficiently high doping and to simultaneously keep the lattice-defection gradient in the junction area as abrupt as possible.

It is an object of the invention to eliminate these difficulties and to thereby produce GaAs tunnel diodes of the desired qualities in a readily reproducible and economical manner.

According to our invention we fuse or alloy onto a p-type base material of GaAs an electrode consisting substantially or entirely of tin for thereby forming in the GaAs semiconductor the required highly-doped n-type region adjacent to the tin electrode.

It is of advantage, for the purposes of the invention, to use, as starting material, GaAs of p-type conductance, for example doped with Zn, whose Hall constant is below $5\cdot10^{-1}$, preferably between $1\cdot10^{-1}$ and $2\cdot10^{-2}$ cm.$^3$/amp. sec., and to produce the n-type region by the above-mentioned alloying of tin onto a surface zone of the GaAs semiconductor. Preferably employed for this alloying purpose is the method known, for example, from British Patent 757,672.

The discovery according to our invention is contrary to the prevailing assumption that Sn, relative to GaAs, has no doping action, or at best operates weakly as a donor because acceptor and donor action of tin upon GaAs approximately compensate each other.

However, we have found and ascertained by tests that it is possible to overcompensate by means of Sn the high p-concentration in GaAs, and to obtain a sufficiently high n-type conductance in the recrystallizing region of the GaAs body adjacent to the electrode. Another advantage of thus using Sn is its newly discovered, extremely slight rate of diffusion in GaAs. This has the consequence that the p-n junction, during the short time interval of the alloying operation, is not broadened by diffusion. When the lattice-defection atoms have a high diffusion constant, the short time interval of the alloying operation is often sufficient to broaden the p-n junction to such an extent that the negative resistance of the diode is greatly increased; but this is not encountered when using Sn or GaAs according to the invention.

The alloying of the Sn onto the GaAs body is preferably effected at a temperature of 450 to 600° C. The alloying interval is to be kept as short as possible. An interval of one-half to one minute has been found sufficient. The heating-up to the alloying temperature as well as the subsequent cooling are preferably kept as rapid as possible. The alloying operation is performed, as usual, within a protective gas atmosphere, for example a noble gas or hydrogen. Prior to alloying, the GaAs surfaces are preferably treated in the known manner, for example by grinding or etching.

The counter electrode must be completely barrier free and should possess lowest feasible transfer (contact) resistance. Preferably used as counter electrode is likewise tin, except that it is provided with acceptor or inhibitor substance. Suitable, for example, is an electrode of Sn which contains an admixture of Zn in an amount of up to 20 atom percent, for example about 0.1 to about 2% by weight. Also applicable is a Sn—Cd electrode comprising from effective traces up to 20 atom percent of cadmium, the remainder being tin. Likewise applicable is pure indium, or indium with an addition of one or both of the metals Zn and Cd, for example in a total amount of up to 20 atom percent, the remainder being indium.

It is preferable to simultaneously alloy both electrodes, namely the tin electrode for producing the p-n junction and the barrier-free counter electrode, onto the GaAs body. We have also found that pure tin can be used as counter electrode, if this Sn electrode, during the alloying operation, is used as an intermediate layer between the GaAs body and a supporting plate of copper or brass. When subjecting the assembly of GaAs, Sn and copper or brass to the alloying operation, the GaAs body and the supporting plate become bonded together, with the Sn acting as a solder. We assume that the molten Sn dissolves some Cu and/or Zn of the carrier plate which then entirely or partially compensates the n-doping action of the Sn. The method just described affords a particularly simple manufacture of the tunnel diodes as apparent from the following example.

Placed upon a copper or brass supporting plate is an Sn foil, for example 100 microns thick. Placed upon the foil is the GaAs body previously etched in aqua regia and having a thickness of about 500 microns. Placed upon the GaAs body is another Sn foil approximately 100 microns thick, or an Sn ball or pellet of some 100 microns diameter. For performing the alloying process, the assembly of layers is subjected for about 30 seconds to a temperature of 600° C. in an inert-gas furnace. This produces the n-region and an abrupt junction of that region with the original p-type semiconductor body, and simultaneously produces a barrier-free junction of the semiconductor body with the counter electrode.

In the production of a barrier-free counter electrode we also obtained very good results by electrolytically precipitating a metal coating. The intimate contact of the electrolytically deposited metal upon the strongly degenerated semiconductor results in a small contact resistance between the two substances. The counter electrode can be produced in this manner by electroplating the GaAs body with copper, for example. Also suitable is an electroplating of gold, silver or other noble metal. Indium and tin are applicable in the same manner. After thus depositing the barrier-free metal electrode, the counter electrode of the tunnel diode can subsequently be soldered together with a suitable supporting plate of metal.

According to a modification of the invention, the Sn for producing the n-type conductance region in the GaAs body is given an admixture of donor substance. The donor addition to tin may amount from traces or a few per mil up to a few percent (0.001 to 5% by weight), preferably up to 10 atom percent. Germanium and/or silicon can thus be added to the tin. This can be done, for example, by melting Sn together with the desired quantity of Ge or Si and then permitting the melt to rapidly solidify. The addition of Ge or Si up to 10 atom percent results in increased donor concentration in the recrystallized n-region of the GaAs body and thus in a further reduction of the negative resistance. In all other respects the method can be performed in the same manner as described above with reference to the pure-tin p-n forming electrode.

Also suitable as a donor addition to the tin electrode are a few per mil up to a few percent by weight (up to 20 atom percent) of one or more elements from the sixth group of the periodic system, preferably S, Se and/or Te. This also results in increasing the donor concentration in the recrystallized n-region of the semiconductor body. In all other respects the method can be performed in exactly the same manner as described above with reference to a pure-tin p-n junction forming electrode.

For further description of the invention reference will be made to the accompanying drawings in which.

Figure 1:
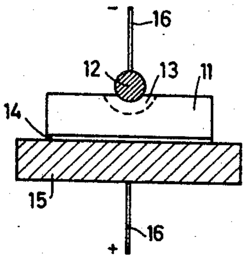
FIG. 1 shows schematically on enlarged scale an embodiment of a tunnel diode according to the invention.

The semiconductor body 11 of the tunnel diode according to FIG. 1 consists of a circular disc of GaAs. The body 11 is alloy-bonded together with a Sn electrode 12. The n-type region produced in the GaAs body 11 by the alloying is denoted by 13. The semiconductor body further carries a counter electrode of Sn 14 which joins the semiconductor body with a carrier plate 15 of copper or brass. Two current leads 16 are connected with electrode 12 and the plate 15 respectively. The proper polarities of leads 16 are denoted by (+) and (−). The p-n junction is schematically represented by a broken line. As explained above, the Sn electrode adjacent to the p-n junction may also be designed as a flat area electrode similar to the electrode 14.

Figure 2:
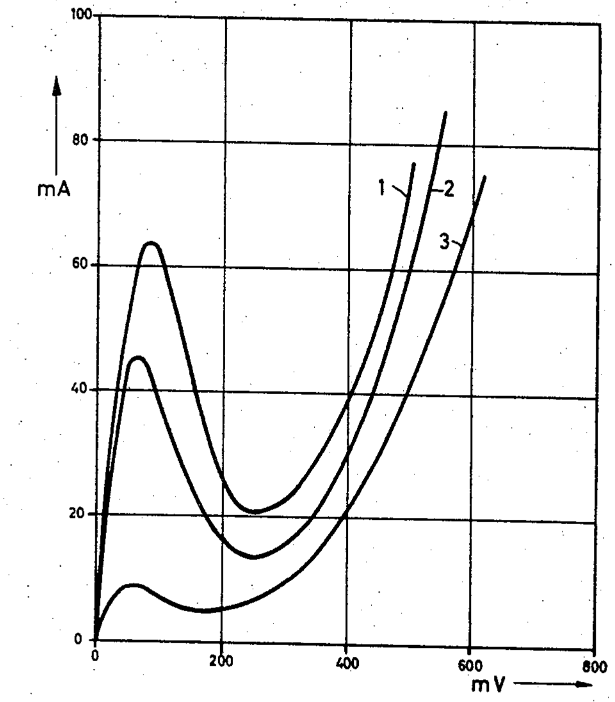
FIG. 2 is a graph showing the voltage-current characteristic of three different tunnel diodes according to the invention.

In the diagram of FIG. 2, the abscissa indicates voltage in millivolt, and the ordinate indicates current in milliamp. Shown are the characteristics of three GaAs tunnel diodes according to the invention, differing from each other by the doping of the semiconductor main body. Curve 1 corresponds to a main GaAs body having a Hall constant of $6\cdot10^{-2}$ cm.$^2$/amp. sec. Curve 2 corresponds to a body with a Hall constant of $2\cdot10^{-1}$ and curve 3 to a body with a Hall constant of $4\cdot10^{-1}$ cm.$^2$/amp. sec. The three specimens had the same design corresponding to FIG. 1, and the same dimensions. The diameter of the tin ball 12 was 0.2 mm. In each specimen the two electrodes 12 and 14 were alloyed onto the GaAs body 11 in the above-described manner by a single alloying operation performed at 600° C. during 30 seconds. The diagram shows that the typical tunnel-diode characteristic, having a range of negative resistance, becomes more pronounced with an increased doping of the GaAs base body.

Figure 3:
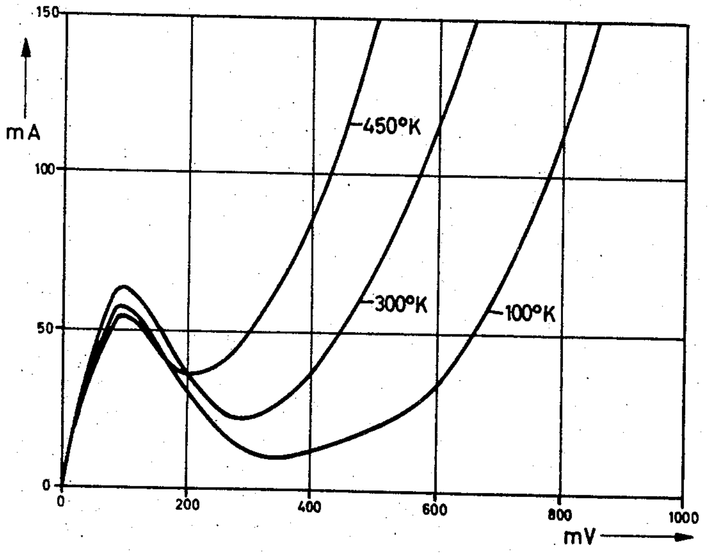
FIG. 3 is a voltage-current diagram representative of the temperature characteristic of tunnel diodes according to the invention.

In the diagram of FIG. 3 the abscissa denotes voltage in millivolt. The ordinate denotes current in milliamps. The diagram shows the temperature dependence of the characteristic for a tunnel diode according to the invention (corresponding to the characteristic 1 in FIG. 2) for three different temperatures indicated in degree Kelvin. It is apparent from the diagram that the negative resistance does not vary appreciably in the wide range between the temperature of liquid air and approximately 200° C. This is an outstanding advantage of tunnel diodes according to the invention in comparison with other tunnel diodes, for example those having a germanium base body.

We claim:

1. A tunnel diode comprising a gallium-arsenide semiconductor body of p-type conductance, and a tin electrode fusion-bonded with said body and forming an n-type fusion region together therewith.

2. A tunnel diode comprising a p-type gallium arsenide semiconductor wafer, a barrier-free electrode fused together with said body on one side thereof and in area contact therewith, and an electrode consisting substantially all of tin and alloy-bonded to said body at the other side thereof and forming an n-type junction region together with said body.

3. In a tunnel diode according to claim 1, said tin electrode containing from effective traces up to about 10 atom percent of donor substance.

4. A tunnel diode comprising a gallium-arsenide semiconductor body of p-type conductance, and an electrode fused together with said body, said electrode consisting substantially of tin and containing from traces up to 10 atom percent of at least one substance selected from the group consisting of germanium and silicon.

5. A tunnel diode comprising a gallium-arsenide semiconductor body of p-type conductance, and an electrode fused together with said body, said electrode consisting substantially of tin and containing from effective traces up to 20 atom percent of at least one substance selected from the group consisting of sulfur, selenium and tellurium.

6. A tunnel diode comprising a semiconductor body of gallium arsenide doped with zinc and having p-type conductance, and a tin electrode fusion-bonded with said body and forming an n-type fusion region together therewith.

7. A tunnel diode comprising a gallium-arsenide semiconductor body of p-type conductance having a Hall constant between 0.1 and 0.02 $cm.^3$/amp. sec., and a tin electrode fusion-bonded with said body and forming an n-type fusion region together therewith.

8. A tunnel diode comprising a gallium-arsenide semiconductor body of p-type conductance, a tin electrode fusion-bonded with said body and forming an n-type fusion region together therewith, and a barrier-free counter electrode area-bonded with said body and consisting of tin with an admixture of acceptor substance in an amount from effective traces up to 20 atom percent.

9. A tunnel diode comprising a gallium-arsenide semiconductor body of p-type conductance, a tin electrode fusion-bonded with said body and forming an n-type fusion region together therewith, and a barrier-free counter electrode area-bonded with said body and consisting of tin with an admixture of up to 20 atom percent zinc.

10. A tunnel diode comprising a gallium-arsenide semiconductor body of p-type conductance, a tin electrode fusion-bonded with said body and forming an n-type fusion region together therewith, and a barrier-free counter electrode area-bonded with said body and consisting of tin with an admixture of cadmium.

11. A tunnel diode comprising a gallium-arsenide semiconductor body of p-type conductance, a tin electrode fusion-bonded with said body and forming an n-type region together therewith, and a barrier-free counter electrode area-bonded with said body and consisting substantially of indium.

12. A tunnel diode comprising a gallium-arsenide semiconductor body of p-type conductance, a tin electrode fusion-bonded with said body and forming an n-type region together therewith, and a barrier-free counter electrode area-bonded with said body and consisting substantially of indium and containing an admixture of a few percent of at least one substance selected from the group consisting of zinc and cadmium.

13. A tunnel diode comprising a gallium-arsenide semiconductor body of p-type conductance, a tin electrode fusion-bonded with said body and forming an n-type alloy region together therewith, and a barrier-free counter electrode area-bonded with said body and consisting of a copper-containing base plate and a tin layer between said base plate and said gallium arsenide body.

References Cited in the file of this patent

UNITED STATES PATENTS

| | | |
|---|---|---|
| 2,829,422 | Fuller | Apr. 8, 1958 |
| 2,842,831 | Pfann | July 15, 1958 |
| 2,931,958 | Arthur et al. | Apr. 5, 1960 |
| 2,937,324 | Kroko | May 17, 1960 |

Notice of Adverse Decision in Interference

In Interference No. 93,256 involving Patent No. 3,041,508, H.-J. Henkel and R. Gremmelmaier, TUNNEL DIODE AND METHOD OF ITS MANUFACTURE, final judgment adverse to the patentees was rendered June 30, 1966, as to claims 1, 2 and 6.

[*Official Gazette December 13, 1966.*]